US008380656B2

(12) United States Patent
Sundaresan et al.

(10) Patent No.: US 8,380,656 B2
(45) Date of Patent: Feb. 19, 2013

(54) TECHNIQUE FOR FAST POWER ESTIMATION USING PROBABILISTIC ANALYSIS OF COMBINATIONAL LOGIC

(75) Inventors: Krishnan Sundaresan, Sunnyvale, CA (US); Wei-Lun Hung, Santa Clara, CA (US); Jaewon Oh, Cupertino, CA (US); Robert E. Mains, Morgan Hill, CA (US)

(73) Assignee: Oracle America, Inc., Redwood City, CA (US)

( * ) Notice: Subject to any disclaimer, the term of this patent is extended or adjusted under 35 U.S.C. 154(b) by 666 days.

(21) Appl. No.: 12/610,194

(22) Filed: Oct. 30, 2009

(65) Prior Publication Data

US 2011/0106748 A1    May 5, 2011

(51) Int. Cl.
*G06F 15/00* (2006.01)
*G06F 15/18* (2006.01)
*G06F 17/50* (2006.01)

(52) U.S. Cl. .................. 706/62; 703/14; 703/15

(58) Field of Classification Search .......... 706/62; 703/14, 15

See application file for complete search history.

(56) References Cited

U.S. PATENT DOCUMENTS 5,966,523 A * 10/1999 Uchino .............. 703/2

OTHER PUBLICATIONS

F. Najm, "A Survey of Power Estimation Techniques in VLSI Circuits", IEEE Tran. on VLSI Systems, vol. 2, No. 4, Dec. 1994, pp. 446-55.*

* cited by examiner

*Primary Examiner* — Kakali Chaki
*Assistant Examiner* — Vincent Gonzales
(74) *Attorney, Agent, or Firm* — Osha Liang LLP

(57) ABSTRACT

A method for computing power consumption includes querying a software database for a key node and a gate comprising an input port, connected to the key node, and an output port. The software database is created from a net list associated with a design. The method includes calculating a probability of activity level at the output port based on a predetermined activity level at the key node, and querying the software database for next gate comprising a next input port, connected to the previous output port, and a next output port. The method includes calculating a probability of activity level at the next output port based on the probability of activity level at the previous output port. The method includes computing a sub-circuit gate power by sum of power of all the gates based on the probability of activity level at output ports of the gates.

16 Claims, 5 Drawing Sheets

TECHNIQUE FOR FAST POWER ESTIMATION USING PROBABILISTIC ANALYSIS OF COMBINATIONAL LOGIC

BACKGROUND

It is important to estimate power consumption at each stage of a microprocessor design to ensure that the power consumption remains within a specified budget. The power estimation is done by simulation based tools such as a dynamic cycle-by-cycle (i.e., vector-based) simulation. However, the power estimation done by the simulation based tools results in very long run-times, especially for large circuits. In earlier stages of the microprocessor design, a faster turn-around time for power estimation is more important, even at the expense of some accuracy. Thus, long run-times due to the simulation based tools are unacceptable in earlier stages of the microprocessor design.

SUMMARY

In one or more embodiments, the present invention relates to a method for computing power consumption, comprising: querying, using a computer processor, a software database for a key node, wherein the software database is created from a net list associated with a design; querying, using the computer processor, the software database for a first gate comprising a first input port and a first output port, wherein the first input port is connected to the key node; calculating, using the computer processor, a probability of activity level at the first output port based, in part, on a predetermined activity level at the key node; querying, using the computer processor, the software database for a second gate comprising a second input port and a second output port, wherein the second input port is operatively connected to the first output port; calculating, using the computer processor, a probability of activity level at the second output port based, in part, on the probability of activity level at the first output port; and computing a sub-circuit gate power by sum of a power of the first gate based, in part, on the probability of activity level at the first output port and a power of the second gate based, in part, on the probability of activity level at the second output port.

In one or more embodiments, the present invention relates to a computer readable medium storing instructions to compute power consumption, the instructions comprising functionality to: query a software database for a key node, wherein the software database is created from a net list associated with a design; query the software database for a first gate comprising a first input port and a first output port, wherein the first input port is connected to the key node; calculate a probability of activity level at the first output port based, in part, on a predetermined activity level at the key node; query the software database for a second gate comprising a second input port and a second output port, wherein the second input port is operatively connected to the first output port; calculate a probability of activity level at the second output port based, in part, on the probability of activity level at the first output port; and compute a sub-circuit gate power by sum of a power of the first gate based, in part, on the probability of activity level at the first output port and a power of the second gate based, in part, on the probability of activity level at the second output port.

In one or more embodiments, the present invention relates to a system for computing power consumption, comprising: a processor; a partitioning module configured to partition a design into a plurality of sub-circuits bounded by a plurality of key nodes; a deterministic module configured to compute a deterministic power by sum of power of each internal circuit block of a plurality of internal circuit blocks and power of each cell of a plurality of cells, wherein the power of each cell is based on a predetermined activity level at output of the each cell; a probabilistic module configured to: calculate a probability of activity level at output of each gate of a plurality of gates, compute a gate power by sum of power of each gate, wherein the power of each gate is based, in part, on a probability of activity level at output of each gate, extract capacitance of each wire, of a plurality of wires, connected to the output of each gate, compute a wire power by sum of power of each wire, wherein the power of each wire is based on the probability of activity level at the output of each gate connected to the wire and the capacitance of each wire, and compute a probabilistic power by sum of the gate power and the wire power; and an aggregation module configured to compute an aggregate power by sum of the deterministic power and the probabilistic power.

Other aspects and advantages of the invention will be apparent from the following description and the appended claims.

DETAILED DESCRIPTION

Figure 1:
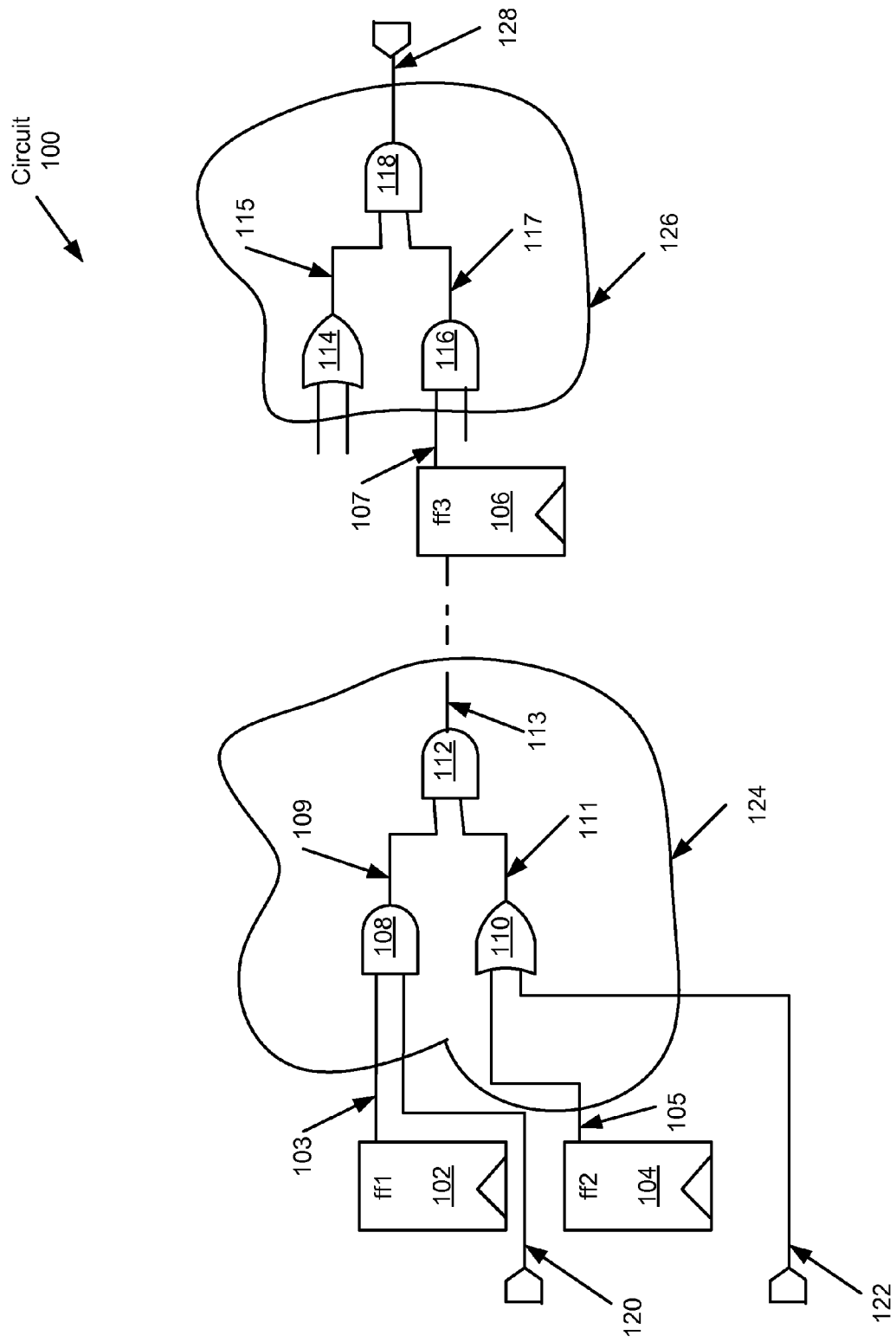
FIGS. 1 and 2 depict a circuit diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for computing power consumption. Specifically, embodiments of the invention provide a method and system to compute a probabilistic power.

The concept of a key node and a combinational cloud (i.e., sub-circuit) will be used while describing this invention. The key node comprises any of an input pin, an output pin, an input of a state-storing circuit element such as a flip-flop, an output of a state-storing circuit element such as a flip-flop, an input of an internal circuit block (e.g., embedded macro), and an output of an internal circuit block (e.g., embedded macro). The key nodes do not change for a design at various levels, e.g., register-transfer level (RTL) abstraction of design, gate level design after synthesis, and transistor level design.

The gate level design is first partitioned (i.e., separated) into combinational clouds, such that each combinational cloud is bounded by a number of key nodes. Each combinational cloud contains one or more of these gates (i.e., logic gates): NOR, NAND, AND, OR, MUX, NOT, XOR and XNOR. It will be obvious to those skilled in the art, that other type of gates (i.e., logic gates) can be included in the combinational cloud without deviating from the spirit of the present invention.

The concept of key nodes and combinational clouds is used to estimate power in a microprocessor and/or a large gate level design. Specifically, the technique of probabilistic analysis is discussed for estimating the power. The probabilistic analysis provides much faster turn-around time as compared to dynamic cycle-by-cycle (i.e., vector-based) simulation for power computation, without sacrificing much in accuracy. A typical improvement of ten times in turn-out time with a typical loss of accuracy of one percent has been observed.

The circuit 100 in FIG. 1 is used as an illustration to explain one or more embodiments of the invention. The circuit 100 contains two combinational clouds 124 and 126, two input pins 120 and 122, an output pin 128, and three flip-flops 102, 104, and 106. The key nodes in FIG. 1 are input pin 120, input pin 122, output pin 128, node 103 (i.e., output of flip-flop 102), node 105 (i.e., output of flip-flop 104), and node 107 (i.e., output of flip-flop 106). The combinational cloud 124 contains AND gate 108, OR gate 110, and AND gate 112. The combinational cloud 126 contains OR gate 114, AND gate 116, and AND gate 118. In one or more embodiments of the invention, one or more internal circuit blocks (e.g., embedded macros) may be included in circuit 100. The internal circuit blocks are excluded from power estimation by the probabilistic analysis, and the predetermined power of the internal circuit blocks is added later to compute the aggregate power.

The combinational cloud 124 has five associated key nodes shown in circuit 100: 103, 105, 120, 122, and 113. The key nodes constitute both the inputs to a combinational cloud and the outputs to a combinational cloud. The key nodes 103, 105, 120, and 122 are inputs to the combinational cloud 124 and key node 113 is an output of the combinational cloud 124. The combinational cloud 126 has two associated key nodes shown in circuit 100: key node 107 as an input to the combinational cloud 126 and key node 128 as an output of the combinational cloud 128.

FIG. 1 shows a circuit 100 in accordance with one or more embodiments of the invention. Those skilled in the art, having the benefit of this detailed description, will appreciate the components shown in FIG. 1 may differ among embodiments of the invention, and that one or more of the components may be optional. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

Figure 2:
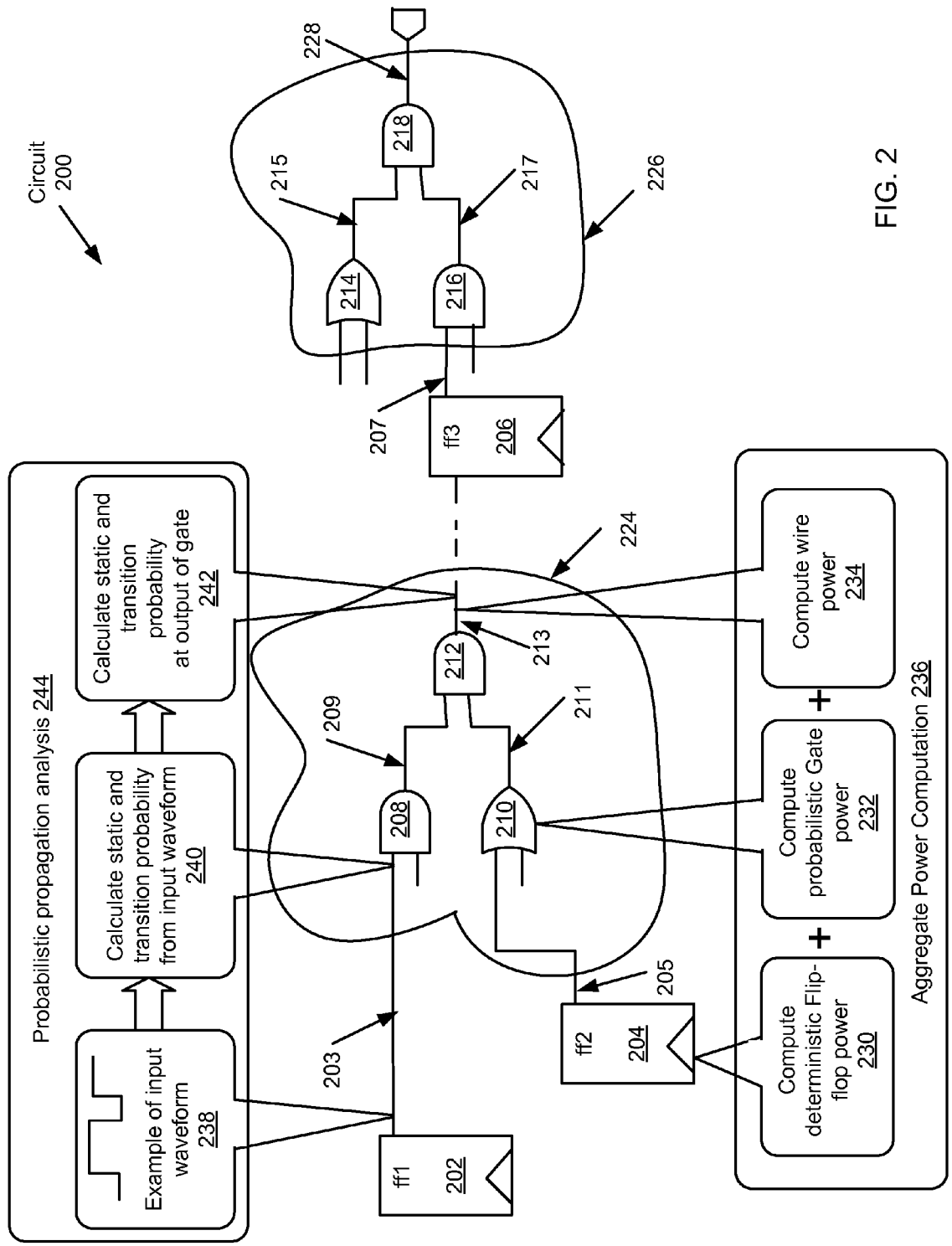

FIG. 2 shows a circuit 200 in accordance with one or more embodiments of the invention. The combination clouds 224 and 226 in circuit 200 are similar to combination clouds 124 and 126 in circuit 100. The flip-flops 202, 204, and 206 in circuit 200 are similar to flip-flops 102, 104, and 106 in circuit 100. The gates 208, 210, 212, 214, 216, and 218 in circuit 200 are similar to gates 108, 110, 112, 114, 116, and 118 in circuit 100.

The probability of activity level at the key nodes are obtained from architectural simulation. In case of a key node driving an input to a gate, the probability of activity level at output of the gate is calculated using a predetermined activity level (e.g., from an architectural simulation) at the key node. In one or more embodiments of the invention, the predetermined activity level at a key node refers to the probability of activity level at the key node calculated by using information from the architectural simulation. A probabilistic power for the gate and the wire connected to output of the gate is calculated based upon the probability of activity level at output of the gate. The deterministic power of a circuit element, e.g., flip-flop with output port as a key node, can be calculated based upon the predetermined activity level at the key node. The deterministic power can be added to the probabilistic power to compute an aggregate power. The two paths shown in circuit 200, probabilistic propagation analysis (244) and aggregate power computation (236), illustrate this description.

Before describing circuit 200 in more detail, the concepts of static probability and transition probability are described. The static probability represented by Ps has two variants as Ps(1) and Ps(0). Ps(1) is the static probability for a given signal to be in logic high state, and Ps(0) is the static probability for a given signal to be in logic low state. As an example, if a signal is in logic high state for two clock cycles out of a period of ten clock cycles, the static probability Ps(1) would be 2/10 or 0.2. The static probability Ps(0) for the same signal, under the specified conditions, would be 8/10 or 0.8. It is obvious that Ps(1)+Ps(0)=1, because a signal is either in a logic high state or in a logic low state at any given time.

The transition probability represented by Pt has two variants as Pt(U) and Pt(D). For a given signal, Pt(U) is the transition probability for switching from logic low state to logic high state (i.e., up transition), and Pt(D) is the transition probability for switching from logic high state to logic low state (i.e., down transition). As an example, if a signal switches six times from logic low state to logic high state (i.e., up transition) over a period of ten clock cycles, Pt(U) is 6/10 or 0.6. It is not possible to calculate Pt(D) over the same period of ten clock cycles without knowing actual number of times the given signal switches from logic high state to logic low state (i.e., down transition). In this example, the Pt(D) can be 5/10, 6/10, or 7/10, because the number of up transitions and the number of down transitions can be the same or differ by one.

The probability of activity level at a given node includes static and transition probabilities Ps(1), Ps(0), Pt(U) and/or Pt(D). The probability of activity level at the key nodes are pre-determined and calculated from results of the architectural simulation. In one or more embodiments of the invention, the waveforms for key nodes are generated by the architectural simulation, and the signal/waveform dumps of the key nodes may be represented by well known formats like fast scan database (FSDB), value change dump (VCD), or VCD plus dump (VPD). From this predetermined waveforms of the key nodes, probability of activity level, i.e., Ps(1), Ps(0), Pt(U) and/or Pt(D), at the key nodes can be calculated. The probability of activity level at the remaining nodes, e.g., at outputs of the gates, are calculated by using the probability of activity level at inputs of the gates.

The probabilistic propagation analysis (244) in circuit 200 is described in detail now. The node 203, i.e., the output of flip-flop 202, is a key node with predetermined waveform in FSDB or any other standard input waveform format (238). With the predetermined FSDB waveform (238), the calculation for probability of activity level at node 203 comprises calculating static and transition probability from the FSDB waveform (240). The static probability includes Ps(1) and Ps(0), and the transition probability includes Pt(U) and Pt(D). The probability of activity level at node 203 is considered predetermined, since it is calculated from the predetermined waveform in FSDB format. In one or more embodiments of the invention, the probability of activity level at node 203 may be directly available, without requiring calculations based upon information from a waveform. It will be obvious to those skilled in the art, that predetermined activity level at key nodes can be obtained in alternate ways without deviating from the spirit of the present invention.

The probability of activity level (i.e., static and transition probability) at output of gate 208 can be calculated based upon the probability of activity level at inputs of the gate 208. Thus probability of activity level at node 209 is calculated based upon, in part, the predetermined activity level at node 203. The probability of activity level (i.e., static and transition probability) at output of the gate 212, i.e., the node 213, can be calculated (242) based upon the probability of activity levels at the node 209 and the node 211.

An exemplary description is given here for calculation of a probability of activity level at the output of a two inputs AND gate, with A and B as input ports and Z as an output port. It is assumed that inputs A and B are temporally and spatially independent. A, B, and Z can be in either of these four states: 1 (static logic high state), 0 (static logic low state), U (up transition, from logic low state to logic high state), D (down transition, from logic high state to logic low state). The equations for probability of the output, i.e., P(Z), are shown below in terms of probability of inputs P(AB). The notation Ps(1) is abbreviated as P(1), Ps(0) as P(0), Pt(U) as P(U), and Pt(D) as P(D).

a. P(1)=P(11)
b. P(0)=P(00)+P(01)+P(10)+P(UD)+P(DU)+P(0U)+P(U0)+P(0D)+P(D0)
c. P(U)=P(UU)+P(U1)+P(1U)
d. P(D)=P(DD)+P(D1)+P(1D)

As an example, P(11) is probability when both inputs A and B are in state 1, P(U0) is probability when input A is in state U and input B is in state 0. The equation P(U)=P(UU)+P(U1)+P(1U) indicates that probability of output Z in state U can be calculated by summing up the probabilities for both A and B in state U, A in state U and B in state 1, and A in state 1 and B in state U.

While an example is provided for calculating probability of activity level at output of an AND gate, it will be obvious to those skilled in the art, that probability of activity level at output of AND gate key can be calculated in alternate ways without deviating from the spirit of the present invention. Furthermore, while the equation for calculating probability of activity level is described for an AND gate, it will be obvious to those skilled in the art, that probability of activity level at output of other gates key can be calculated in similar ways. Thus equations can be specified to calculate probability of activity levels at output of various type of gates (i.e., logic gates). By using these equations, probability of activity level at nodes such as 209, 211, 213, 215, 217, and 228 in circuit 200 can be calculated.

As discussed, the probability of activity level at the output of a gate is calculated based upon the probability of activity level at input(s) of the gate. Thus the probability of activity level at output of the gate 208 is calculated based upon the probability of activity level at inputs of the gate 208. The output of a previous gate 208, i.e., node 209, is input to the next gate 212. This process of propagation is repeated again and the probability of activity level at output of next gate 212 is calculated based upon the probability of activity level at inputs of the gate 212. The output of gate 212, i.e., the key node 213, is an input of a flip-flop and hence the process of propagation stops here. The process of propagation can start again at output of flip-flop 206, i.e., the key node 207. The process of propagation continues until the key node 228, i.e., an output pin, is reached.

The aggregate power computation (236) in circuit 200 is described in more detail now. The predetermined activity level at output of flip-flop 204, i.e., activity level at the key node 205, includes probabilities P(1), P(0), P(U) and/or P(D). The probabilities P(1), P(0), P(U) and/or P(D) may be calculated based upon the information from a predetermined waveform and/or a signal dump file. Based upon these static and transition probabilities, the deterministic power of the flip-flop 204 can be computed (230) by the following equation:

$$Pff = pwr0 \cdot P(0) + pwr1 \cdot P(1) + pwrU \cdot P(U) + pwrD \cdot P(D)$$

The power parameters pwr0, pwr1, pwrU, and pwrD may be available from a standard cell power library. In one or more embodiments of the invention, the power parameters for various gates (i.e., logic gates) are obtained from the standard cell library and annotated on the design database. The flip-flop power is considered deterministic power since activity level at output of the flip-flop is predetermined (e.g., provided by an architectural simulation). It is also possible to have internal circuit blocks (e.g., embedded macros) with predetermined power value. Such blocks/macros can be excluded while performing the power computation, but the predetermined power from such blocks/macros can be added later to compute an aggregate power.

The probabilistic power for the gate 210 can be computed (232) based upon the probability of activity level at inputs of the gate 210. The power for the gate 210 can be computed by the following equation:

$$Pgate = pwr00 \cdot P(0) \cdot P(0) + pwr01 \cdot P(0) \cdot P(1) + pwr10 \cdot P(1) \cdot P(0) + pwr11 \cdot P(1) \cdot P(1) + pwr0U \cdot P(0) \cdot P(U) + pwrU0 \cdot P(U) \cdot P(0) + pwr1U \cdot P(1) \cdot P(U) + pwrU1 \cdot P(U) \cdot P(1) + pwrUU \cdot P(U) \cdot P(U) + pwr0D \cdot P(0) \cdot P(D) + pwrD0 \cdot P(D) \cdot P(0) + pwr1D \cdot P(1) \cdot P(D) + pwrD1 \cdot P(D) \cdot P(1) + pwrDD \cdot P(D) \cdot P(D) + pwrDU \cdot P(D) \cdot P(U) + pwrUD \cdot P(U) \cdot P(D)$$

The power parameters pwr00, pwr01, . . . pwrDU, pwrUD are available from a standard cell power library. In one or more embodiments of the invention, the power parameters for various gates are obtained from the standard cell library and annotated on the design database. The power for the gate 210 is considered probabilistic power since output of the gate 210 is not predetermined, i.e., not available directly from the architectural simulation. The power Pgate comprises summation of 16 terms in the format pwrAB·P(A)·P(B), where each of the inputs A and B to the gate 210 can be one of these states: 1, 0, U and D.

The first four terms comprising power parameters pwr00, pwr01, pwr10, and pwr11 constitute a static condition, whereas the remaining 12 terms constitute a transition condition. In one or more embodiments of the invention, the power due to first four terms is separately computed as static/leakage power, and the power due to remaining 12 terms is separately computed as transition/dynamic power. Irrespective of this sub-division, the final aggregate power due to summation of all sources of power is the same.

There is also a component of power due to the wire capacitance. The gates, flip-flops, cells, and internal circuit blocks are interconnected by wires and wires have inherent capacitance. The switching of wires between logic low state and logic high state constitutes wire power. The wire power is computed (234) for the wire connected to output of the gate 212. The wire power (Pwire) can be calculated based upon C (i.e., the wire capacitance), the probabilities P(U) and P(D) for signal at output of the gate 212, supply voltage Vdd, and clock period Tc:

$$Pwire = (1/Tc) \cdot (Vdd^2) \cdot C \cdot [P(U) + P(D)]$$

The wire capacitances can be extracted from the chip layout and annotated on a design database. The wire power can be either deterministic or probabilistic, deterministic in case the node has predetermined activity level and probabilistic otherwise. The summation of computed deterministic flip-flop power (230), computed probabilistic gate power (232), and computed wire power (234) provides the aggregate power computation (236).

Figure 3:
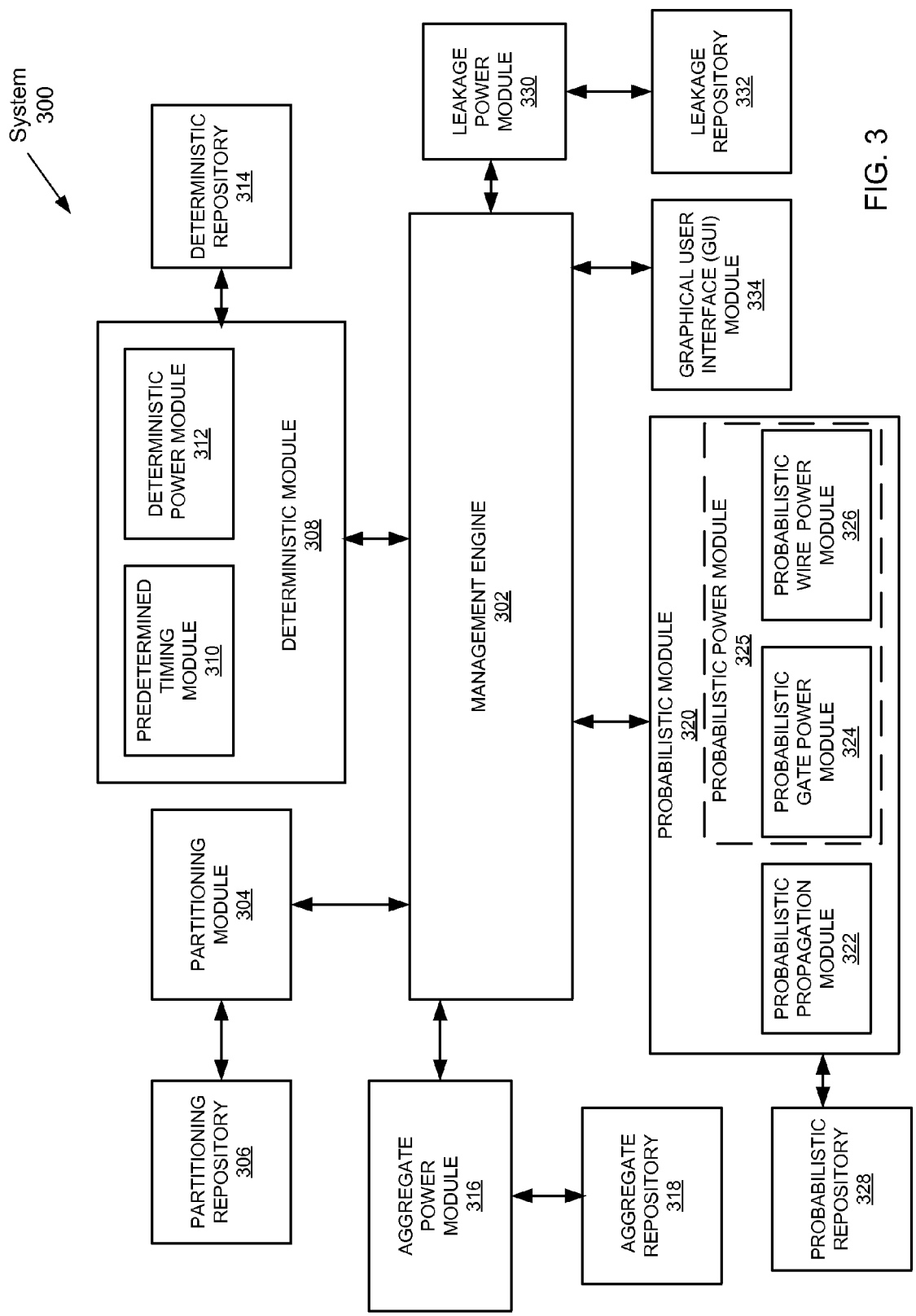
FIG. 3 depicts a block diagram of a system in accordance with one or more embodiments of the invention.

FIG. 3 shows system 300 according to one or more embodiments of the invention. The management engine (302) in system 300 is connected to multiple modules, such as partitioning module (304), deterministic module (308), probabilistic module (320), leakage power module (330), graphical user interface (GUI) module (334), and aggregate power module (316).

The partitioning module (304) is connected to partitioning repository (306). The partitioning module first partitions (i.e., separates) gate level design into combinational clouds (i.e., sub-circuit), such that each combinational cloud is bounded by a number of key nodes. The combinational clouds comprise gates (i.e., logic gates), interconnected by wires. The key node comprises an input pin, an output pin, an input of a flip-flop, an output of a flip-flop, an input of an internal circuit block, and an output of an internal circuit block. The results of partitioning may be stored in the partitioning repository (306), coupled to the partitioning module (304).

The deterministic module (308) comprises predetermined timing module (310) and deterministic power module (312). The predetermined timing module (310) may process timing information of the waveforms (e.g., in FSDB format) generated by the architectural simulation. In one or more embodiments of the invention, the predetermined timing module (310) may calculate various static and transition probabilities from predetermined waveforms generated by the architectural simulation. An example for calculating activity level from a predetermined waveform has been explained earlier under calculating static and transition probability from FSDB waveform (240) in FIG. 2. The deterministic power module (312) computes deterministic power, e.g., flip-flop power based upon the predetermined waveform at output of the flip-flop. An example for deterministic power computation is explained earlier under computing deterministic flip-flop power (230) in FIG. 2. In one or more embodiments of the invention, the deterministic power module (312) also computes a deterministic wire power, i.e., wire power for wires connected to the key nodes. The deterministic repository (314), coupled to the deterministic module (308), stores results of deterministic power computation and/or processing of timing information.

The probabilistic module (320) comprises probabilistic propagation module (322) and probabilistic power module (325). The probabilistic propagation module (322) calculates the probability of activity level at various nodes in a combinational cloud. An example of calculating the probability of activity level at output of a gate in the combinational cloud is explained earlier under calculating static and transition probability at output of gate (242) in FIG. 2.

The probabilistic power module (325) comprises probabilistic gate power module (324) and probabilistic wire power module (326). The probabilistic gate power module computes gate power based upon the probability of activity level at output of the gate. In a similar way, the probabilistic wire power of a wire, connected to output of the gate, is computed based upon the probability of activity level at output of the gate. An example of gate power computation is explained earlier under computing probabilistic gate power (232) in FIG. 2. An example of probabilistic wire power computation is explained earlier under computing wire power (234) in FIG. 2. The probabilistic repository (328), coupled to the probabilistic module (320), stores results of probabilistic power computation and/or probabilistic propagation calculation.

The leakage power module (330) computes gate power while inputs are in static condition, i.e., inputs to the gate are either 1 (static logic high state), or 0 (static logic low state). The static/leakage power is different from the transition/dynamic power, since the transition/dynamic power is associated with at least one of the inputs to the gate in state U (up transition i.e., logic low state to logic high state), or in state D (down transition i.e., logic high state to logic low state). The results of the leakage power computation may be stored in the leakage repository (332), coupled to the leakage power module (330). In one or more embodiments of the invention, the leakage power module (330) may be part of the probabilistic module (320) and/or leakage repository (332) may be part of the probabilistic repository (328).

The aggregate power module (316) computes aggregate power by summation of power from all sources, such as gates, flip-flops, internal circuit blocks, and wires. The aggregate power, comprising deterministic and probabilistic power, is stored in aggregate repository (318), coupled to the aggregation module (316). In one or more embodiments of the invention, partitioning repository (306), deterministic repository (314), probabilistic repository (328), leakage repository (332), and aggregate repository (318) may be combined into a single repository (not shown).

The Graphical user interface (GUI) module (334) is used for entering input data and viewing results of power computation. The input data may comprise providing information and a request for the power computation. The results may comprise computation of deterministic power, probabilistic power, leakage power, and/or aggregate power.

Figure 4:
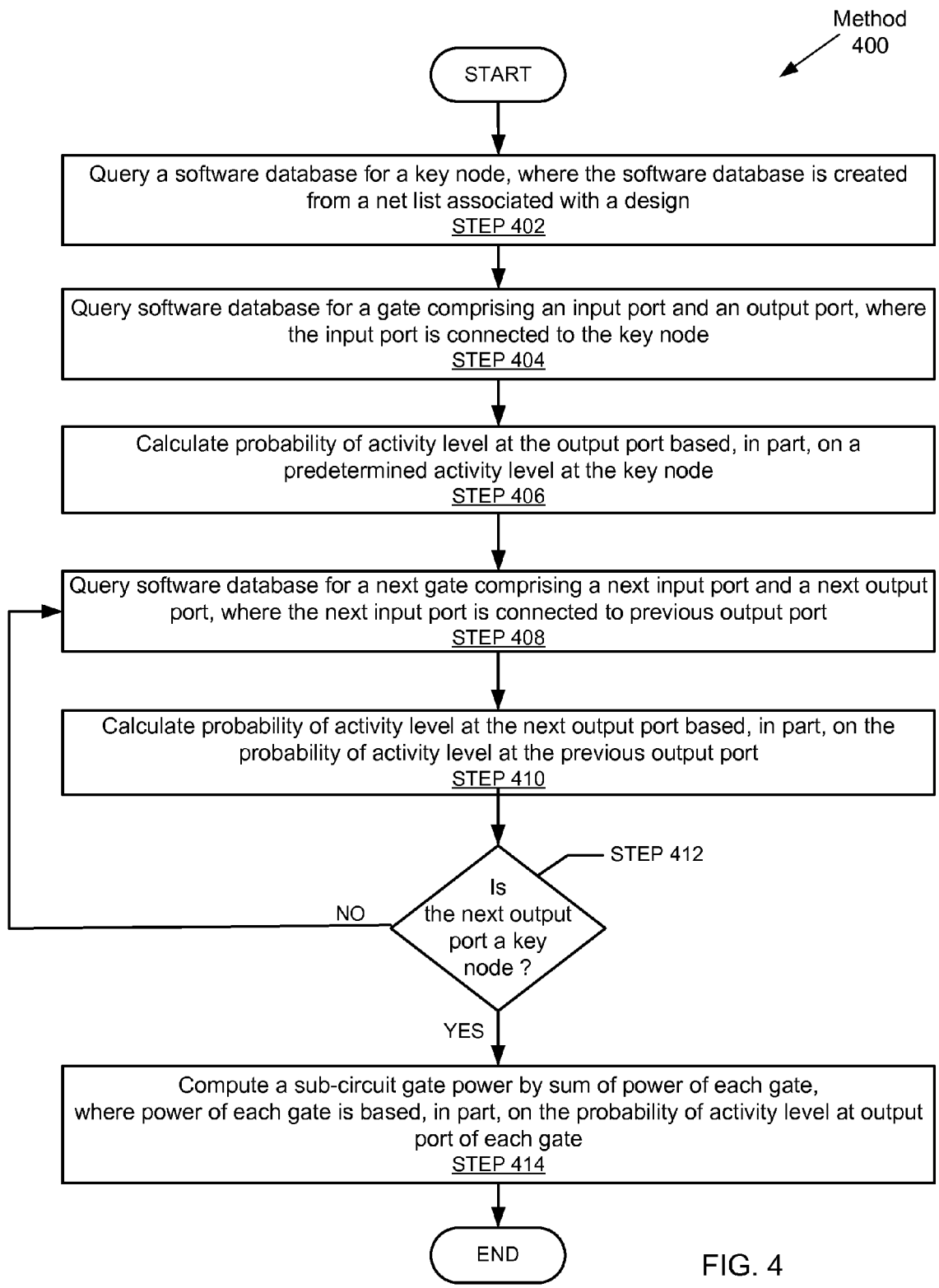
FIG. 4 depicts a method flowchart in accordance with one or more embodiments of the invention.

FIG. 4 shows a flow chart for computing power consumption in accordance with one or more embodiments of the invention. In one or more embodiments of the invention, one or more of the steps described below may be omitted, repeated, and/or performed in a different order.

In the first step, the software data base, created from a net list associated with a gate level design, is queried for a key node (402). The key node comprises an input pin, an output pin, an input of a flip-flop, an output of a flip-flop, an input of an internal circuit block, and an output of an internal circuit block.

The software database is queried for a gate comprising an input port and an output port, where the input port is connected to the key node (404). The gate (i.e., logic gate) comprises NOR, NAND, AND, OR, MUX, NOT, XOR, XNOR, or some other type of gate.

The probability of activity level at the output port is calculated based on a predetermined activity level at the key node (406). The predetermined activity level at the key node, comprising static and transition probabilities, is calculated from information in results of the architectural simulation.

The software data base is queried again for a next gate, comprising a next input port and a next output port, where the next input port is connected to previous output port (408). As an example, gate 108 and gate 112 in FIG. 1 can be respectively considered as a previous gate and a next gate.

The probability of activity level at the next output port is calculated based on the probability of activity level at the previous output port (410). Referring to the example in FIG. 1, the probability of activity level at node 113 is calculated based on the probability of activity level at the node 109.

In the following step, a question is asked whether the next output port is a key node (412). If the answer is no, steps 408 and 410 are repeated again. It is obvious from the flow chart in FIG. 4 that the steps 408 and 410 may not be repeated again, may be repeated one more time, or may be repeated multiple more times, depending upon the outcome from the question in step 412.

In the last step, sub-circuit gate power is computed by sum of power of each gate, where power of each gate is based on the probability of activity level at output port of each gate (414). Referring to FIG. 1 for an example, the sub-circuit gate power for combinational cloud (i.e., sub-circuit) 124 is computed by summation of powers for the gates 108, 110, and 112.

While FIG. 4 illustrates one example of computing power consumption, it will be obvious to those skilled in the art that the estimated power computation can be implemented in other ways without departing from the scope of the invention.

Figure 5:
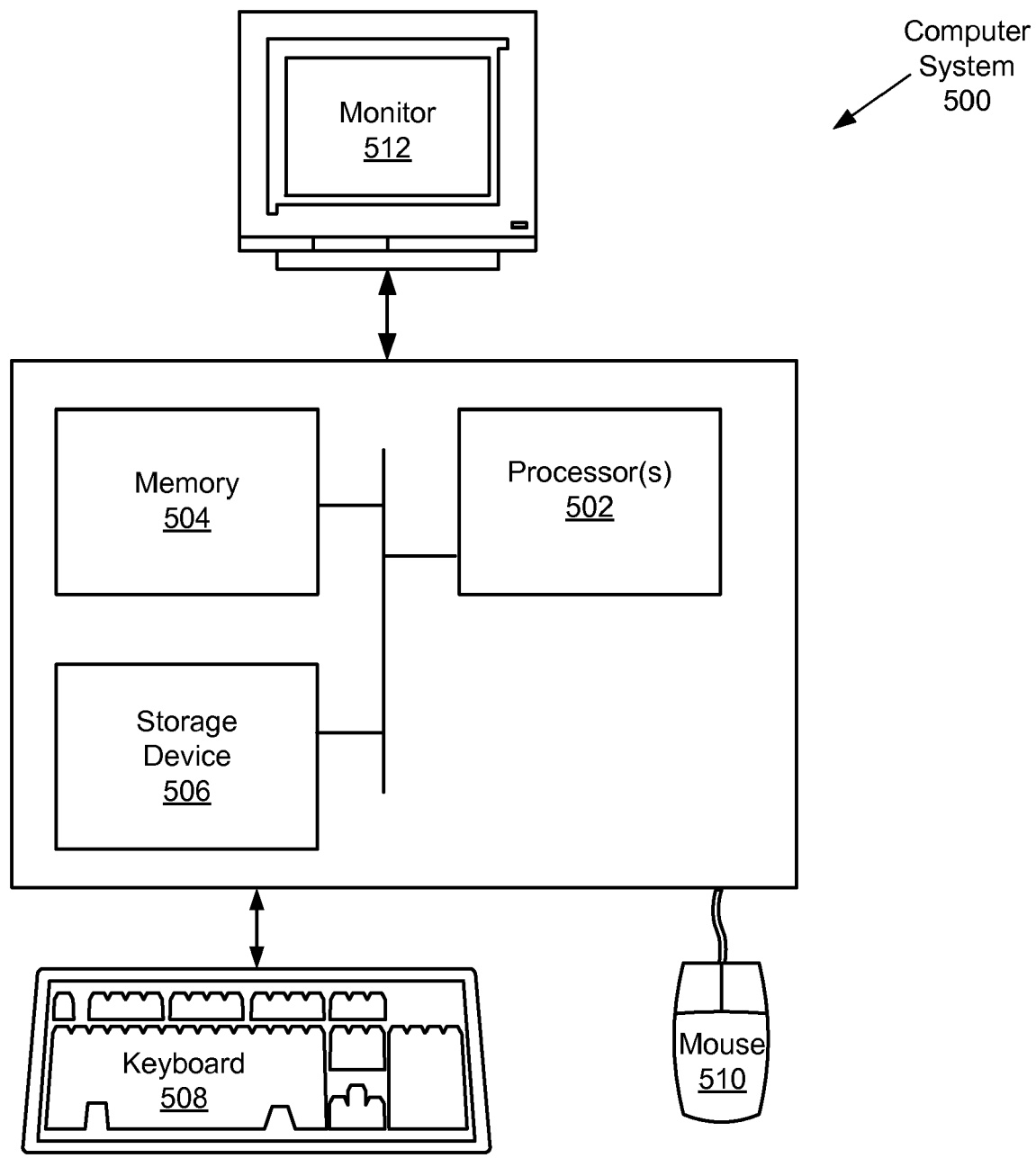
FIG. 5 depicts a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random document access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., various modules of FIG. 3) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for computing power consumption, comprising:
    querying, using a computer processor, a software database for a key node, wherein the software database is created from a net list associated with a design;
    querying, using the computer processor, the software database for a first gate comprising a first input port and a first output port, wherein the first input port is connected to the key node;
    calculating, using the computer processor, a probability of activity level at the first output port based, in part, on a predetermined activity level at the key node;
    querying, using the computer processor, the software database for a second gate comprising a second input port and a second output port, wherein the second input port is operatively connected to the first output port;
    calculating, using the computer processor, a probability of activity level at the second output port based, in part, on the probability of activity level at the first output port;
    computing a sub-circuit gate power by sum of a power of the first gate based, in part, on the probability of activity level at the first output port and a power of the second gate based, in part, on the probability of activity level at the second output port;
    extracting a capacitance of a first wire connected to the first output port and a capacitance of a second wire connected to the second output port;
    computing a sub-circuit wire power by sum of a power of the first wire, based on the probability of activity level at the first output port and the capacitance of the first wire, and a power of the second wire, based on the probability of activity level at the second output port and the capacitance of the second wire;
    computing a probabilistic power by sum of the sub-circuit gate power and the subcircuit wire power;
    computing a deterministic power of the key node based on the predetermined activity level at the key node; and
    computing an aggregate power by sum of the probabilistic power and the deterministic power.

2. The method of claim 1, wherein the key node contains at least one from a group consisting of an input pin, an output pin, a flip-flop input, a flip-flop output, an input of an internal circuit block, and an output of an internal circuit block.

3. The method of claim 1, wherein the second output port is connected to a key node, and wherein the key node contains at least one from a group consisting of an input pin, an output pin, a flip-flop input, a flip-flop output, an input of an internal circuit block, and an output of an internal circuit block.

4. The method of claim 1, wherein the design is a gate level design.

5. The method of claim 4, wherein the key node is an output of a flip-flop or an output of an internal circuit block.

6. The method of claim 5, further comprising:
    receiving a deterministic power value for the internal circuit block; and computing an aggregate power by sum of the probabilistic power and the deterministic power value, wherein the key node is the output of the internal circuit block.

7. A non-transitory computer readable medium storing instructions to compute power consumption, the instructions comprising functionality to:
    query a software database for a key node, wherein the software database is created from a net list associated with a design;

query the software database for a first gate comprising a first input port and a first output port, wherein the first input port is connected to the key node;

calculate a probability of activity level at the first output port based, in part, on a predetermined activity level at the key node;

query the software database for a second gate comprising a second input port and a second output port, wherein the second input port is operatively connected to the first output port;

calculate a probability of activity level at the second output port based, in part, on the probability of activity level at the first output port;

compute a sub-circuit gate power by sum of a power of the first gate based, in part, on the probability of activity level at the first output port and a power of the second gate based, in part, on the probability of activity level at the second output port;

extract a capacitance of a first wire connected to the first output port and a capacitance of a second wire connected to the second output port;

compute a sub-circuit wire power by sum of a power of the first wire, based on the probability of activity level at the first output port and the capacitance of the first wire, and a power of the second wire, based on the probability of activity level at the second output port and the capacitance of the second wire;

compute a probabilistic power by sum of the sub-circuit gate power and the subcircuit wire power;

compute a deterministic power of the key node based on the predetermined activity level at the key node; and compute an aggregate power by sum of the probabilistic power and the deterministic power.

8. The non-transitory computer readable medium of claim 7, wherein the key node contains at least one from a group consisting of an input pin, an output pin, a flip-flop input, a flip-flop output, an input of an internal circuit block, and an output of an internal circuit block.

9. The non-transitory computer readable medium of claim 7, wherein the second output port is connected to a key node, and wherein the key node contains at least one from a group consisting of an input pin, an output pin, a flip-flop input, a flip-flop output, an input of an internal circuit block, and an output of an internal circuit block.

10. The non-transitory computer readable medium of claim 7, wherein the design is a gate level design.

11. The non-transitory computer readable medium of claim 10, wherein the key node is an output of a flip-flop or an output of an internal circuit block.

12. The non-transitory computer readable medium of claim 11, further comprising:

receive a deterministic power value for the internal circuit block; and compute an aggregate power by sum of the probabilistic power and the deterministic power value, wherein the key node is the output of the internal circuit block.

13. A system for computing power consumption, comprising:

a processor;

a partitioning module configured to partition a design into a plurality of subcircuits bounded by a plurality of key nodes;

a deterministic module configured to compute a deterministic power by sum of power of each internal circuit block of a plurality of internal circuit blocks and power of each cell of a plurality of cells, wherein the power of each cell is based on a predetermined activity level at output of the each cell;

a probabilistic module configured to:

calculate a probability of activity level at output of each gate of a plurality of gates, compute a gate power by sum of power of each gate, wherein the power of each gate is based, in part, on a probability of activity level at output of each gate, extract capacitance of each wire, of a plurality of wires, connected to the output of each gate, compute a wire power by sum of power of each wire, wherein the power of each wire is based on the probability of activity level at the output of each gate connected to the wire and the capacitance of each wire, and compute a probabilistic power by sum of the gate power and the wire power; and an aggregation module configured to compute an aggregate power by sum of the deterministic power and the probabilistic power.

14. The system of claim 13, wherein the design is a gate level design and each cell is a flip-flop or an internal circuit block.

15. The system of claim 13, further comprising:

graphical user interface (GUI) for entering an input data and for viewing results for a power computation.

16. The system of claim 13, further comprising:

a leakage power module configured to compute leakage power due to a portion of the plurality of gates, wherein the portion of the plurality of gates is in a static condition.

* * * * *